(12) United States Patent
Hawa

(10) Patent No.: US 11,300,214 B2
(45) Date of Patent: Apr. 12, 2022

(54) TOP ENTRY BALL VALVE

(71) Applicant: Hawa Valves (India) Private Limited, Navi Mumbai (IN)

(72) Inventor: Javed Anwar Hawa, Mumbai (IN)

(73) Assignee: Hawa Valves (India) Private Limited, Navi Mumbai (IN)

( * ) Notice: Subject to any disclaimer, the term of this patent is extended or adjusted under 35 U.S.C. 154(b) by 700 days.

(21) Appl. No.: 15/479,936

(22) Filed: Apr. 5, 2017

(65) Prior Publication Data

US 2017/0299072 A1    Oct. 19, 2017

(30) Foreign Application Priority Data

Apr. 19, 2016  (GB) ...................................... 1606798

(51) Int. Cl.
*F16K 5/20* (2006.01)
*F16K 5/06* (2006.01)
*F16K 25/00* (2006.01)

(52) U.S. Cl.
CPC ............ *F16K 5/201* (2013.01); *F16K 5/0636* (2013.01); *F16K 25/00* (2013.01)

(58) Field of Classification Search
CPC ........ F16K 5/201; F16K 25/00; F16K 5/0636; F16K 5/20
USPC ...... 251/315.11–315.12, 159, 161, 164, 165, 251/160, 188, 192
See application file for complete search history.

(56) References Cited

U.S. PATENT DOCUMENTS

| 3,187,776 A | * | 6/1965 | Snell, Jr. ................ F16K 3/312 138/94.3 |
| 3,653,631 A | | 4/1972 | Hurst |
| 3,934,606 A | * | 1/1976 | Matthews ............... F16K 5/204 137/454.6 |
| 4,506,864 A | * | 3/1985 | Hartmann ............... F16K 5/201 251/174 |

(Continued)

FOREIGN PATENT DOCUMENTS

GB    2143305 A    2/1985

OTHER PUBLICATIONS

United Kingdom Intellectual Property Office, Search Report in United Kingdom Patent Application No. GB1606798.5, dated Jun. 16, 2016, 1 p.

*Primary Examiner* — Michael R Reid
(74) *Attorney, Agent, or Firm* — Leydig, Voit & Mayer, Ltd.

(57) ABSTRACT

A top entry ball valve includes a housing with a central cavity communicating with two bores co-axial along a first axis. A ball valve element is rotatably mounted within the cavity for rotation about a second axis. The valve element includes a through bore; first and second seat assemblies, mounted within the co-axial bores, respectively; first and second gear assemblies engaged with the seat assemblies, respectively; and first and second rotatable drives engaged with the gear assemblies respectively. The gear assemblies are configured to move the seat assemblies along the first axis in a first direction away from the valve element when the drives are rotated in a first direction, and to move the seat assemblies along the first axis in a second direction, opposite to the first direction, when the drives are rotated in the opposite direction, to bring the seat assemblies into sealing contact with the valve element.

6 Claims, 6 Drawing Sheets

(56) References Cited

U.S. PATENT DOCUMENTS 4,727,901 A * 3/1988 Horvei .................... E21B 34/04
                                                    137/315.18
4,844,410 A * 7/1989 Eminger ............... F16K 5/0673
                                                    137/315.18

* cited by examiner

TOP ENTRY BALL VALVE

CROSS-REFERENCE TO RELATED APPLICATIONS

This patent application claims priority to UK Patent Application No. 1606798.5 filed Apr. 19, 2016, which is incorporated herein by reference for all purposes.

TECHNICAL FIELD

The present invention relates a top entry ball valve for controlling the flow of a fluid through a pipe, and a method of assembling such a valve.

BACKGROUND OF THE INVENTION

Ball valves typically comprise of a spherical ball-shaped valve element, with a through bore extending therethrough. The valve element is rotatably mounted in a housing which has aligned openings on either side, one for entry of fluid into the housing and one for exit of fluid from the housing. The valve element may be rotated such that the bore may either be aligned in the same direction as the openings or perpendicular to the openings. In the perpendicular orientation flow through the valve is prevented, while in the parallel direction flow of fluid through the valve is allowed. Each of the openings of the housing is provided with a sealing seat assembly for sealing between the opening and the ball valve element.

In order to assemble such a ball valve, both of the seat assemblies must be retracted while the ball valve element is inserted into the housing. Once the ball valve element has been inserted into the housing, the seat assemblies are returned to seal with the element.

Traditionally, this is achieved with an internal mechanism by way of either a threaded inner and outer seat or a snap ring. The threaded component has either slots or blind holes so that its turning imparts movement of the seat assemblies towards or away from the ball valve element. For cases with a snap ring, the seat assemblies are moved towards the ball by force applied with special tools. The snap ring then fixes the location of the seat assemblies and the ball valve element.

Alternatively, other traditional top entry ball valves are assembled with an external mechanism. External rotary force is applied to the valve in order to create a wedging action. This action moves the seat assemblies towards the ball valve element. This arrangement requires multiple devices depending upon the size of the valve and many devices for bigger valves so that the pushing or pulling action is uniform. This arrangement has to be performed simultaneously, and as such typically requires at least two people to properly construct the ball valve. In addition, the wedging action risks causing damage to the seat through mechanical wear.

All of these traditional assembly methods suffer from a number of common problems. These include inadvertently generating multiple leakage paths due to the relatively complex construction. In addition, special tools are often required which are solely supplied by the valve manufacturer. Such tools typically only work for a single size of valve and as such may vastly increase the maintenance and construction costs of such valves. These tools require trained and skilled operators. In addition, the entire system must be de-commissioned and de-pressurised in order to open the valve for servicing or if the valve is jammed.

The present application provides a top entry ball valve according to claim 1, and a method of assembling a top entry ball valve according to claim 6.

BRIEF DESCRIPTION OF THE DRAWINGS

The invention will now be described in detail, by way of example only, with reference to the accompanying drawings in which.

DETAILED DESCRIPTION OF EMBODIMENTS

Figure 1:
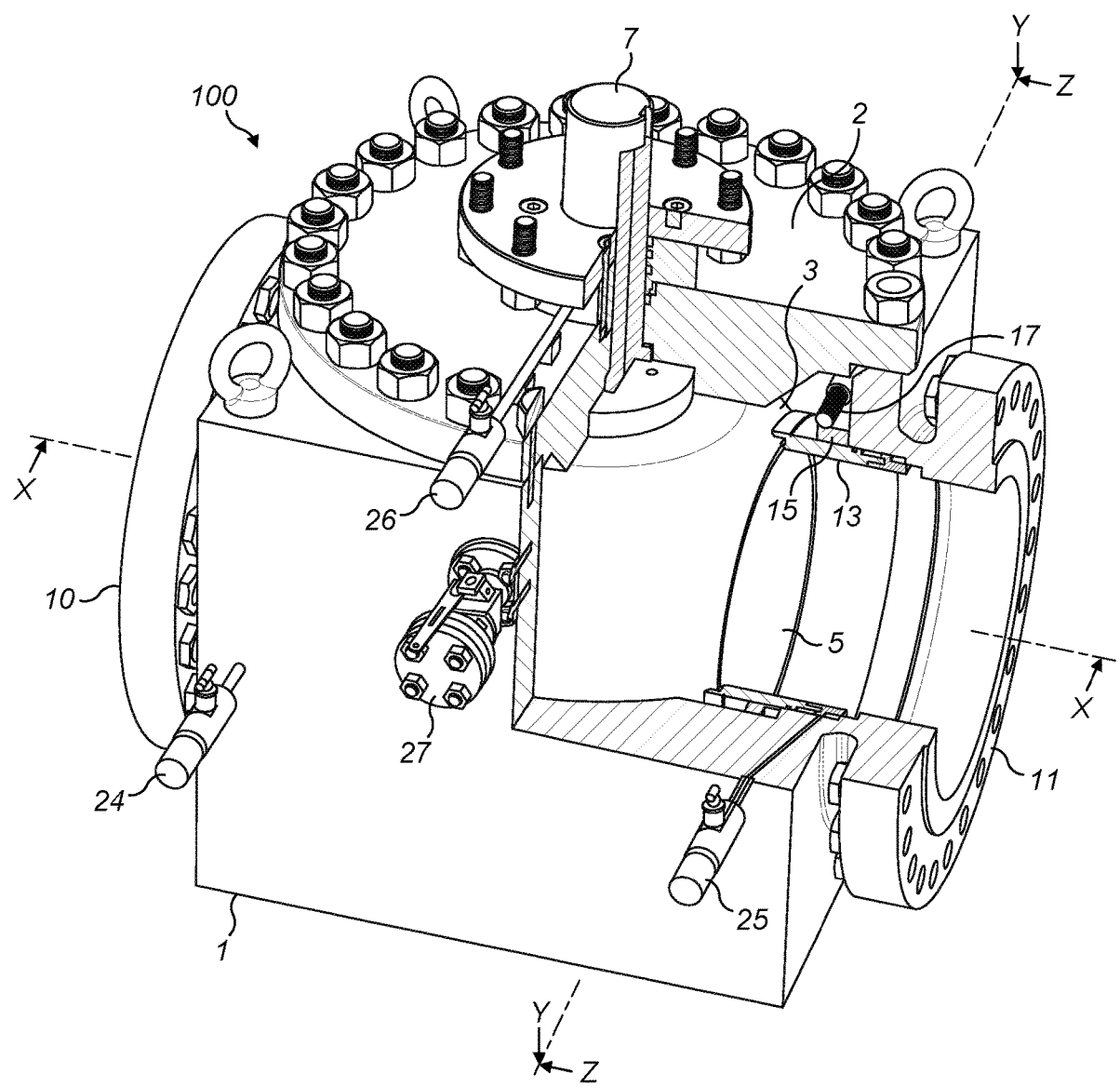
FIG. 1 is a partially cutaway view of a top entry ball valve according to one embodiment of the present invention.

An embodiment of the present invention is shown in the top entry ball valve 100 in FIGS. 1 to 7. The housing 1 of the top entry ball valve 100 is provided with two axially aligned opening bores 10, 11 for attaching in a fluid pipe system. The fluid to be controlled by the top entry ball valve 100 flows through the top entry ball valve 100 along the axis of these axially aligned opening bores 10, 11. For the purposes of the following description, the left opening 10 is considered the entry opening and the right opening 11 is considered the exit opening. However, in use the valve may operate in a reverse orientation. The housing 1 is provided with a central cavity 4, and a top opening. The top opening is covered in use by a valve lid 2 which is attached to the housing 1. The top entry ball valve 100 is provided with venting and drainage connections 24, 25, 26 and 27 as is standard practice in the field.

A ball valve element 3 is mounted within the central cavity 4 in the housing 1. The valve 100 is characterised as a top entry ball valve 100 as the ball valve element 3 is inserted into the central cavity 4 in a direction transverse to the direction of flow of fluid through the top entry ball valve 100. This direction generally corresponds to the axis of the axially aligned opening bores 10, 11. Preferably, the ball valve element 3 may be inserted in a direction perpendicular to the direction of flow of fluid through the top entry ball valve 100. The ball valve element 3 is essentially spherically shaped and comprises a through bore 5. The ball valve element 3 is able to rotate about an axis perpendicular to the axis of the opening bores 10, 11 within the central cavity 4, between a position wherein the bore 5 is axially aligned with the openings 10, 11 as shown in FIG. 1, and a position wherein the bore 5 is perpendicular with the openings 10, 11. Rotation of the ball valve element 3 is driven by a valve stem 7 which is attached to a top surface of the ball valve element 3. In the axially aligned position, fluid flows into the entry opening 10, through the bore 5 of the ball valve element 3 and out of the exit opening 11. In the perpendicular orientation fluid flowing into the entry opening 10 is not able to flow past the ball valve element 3. In this manner a user may rotate the valve stem 7 to control opening and closing of the top entry ball valve 100 in order to control a fluid flow.

Each opening bore 10, 11 is provided with a movable seat assembly 12, 13. The seat assemblies 12, 13 are annular and sit in and form a fluid seal with annular recesses in openings 10, 11 respectively. The inner diameter of the seat assemblies 12, 13 is substantially equal to the inner diameter of the openings 10, 11. Each seat assembly 12, 13 is provided with a sealing surface generally facing the centre of the top entry ball valve 100 and that is shaped to seal against an outer surface of the ball valve element 3. The seat assemblies 12, 13 engage with an inner surface of each opening bore 10, 11 and with an outer surface of the ball valve element 3 to form a liquid tight seal. The seat assemblies 12, 13 are movable in an axial direction along the axis of the openings 10, 11 as described below.

Figure 7:
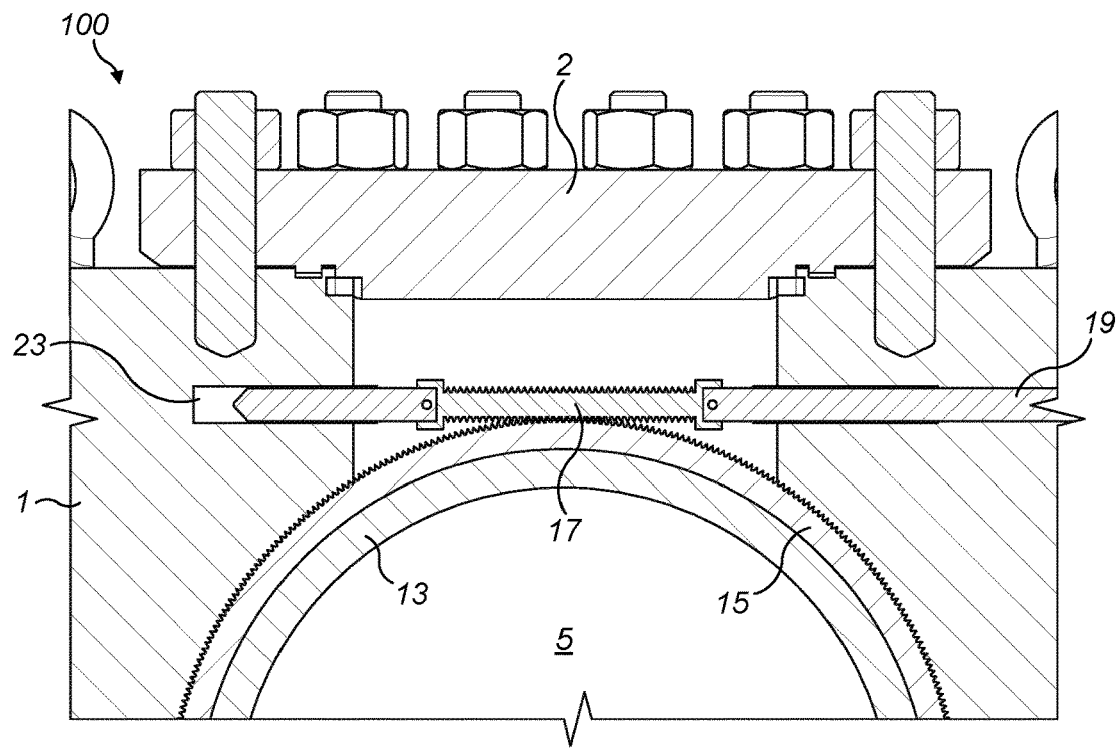
FIG. 7 is an enlarged view of a part of FIG. 6.

Attached to the outer surface of each seat assembly 12, 13 is a geared lock ring 14, 15. The geared lock rings 14, 15 are free to rotate within the housing 1, but are prevented from moving axially. The outer surface of the seat assemblies 12, 13 have a threaded connection with the inner surface of the geared lock rings 14, 15. The geared lock rings 14, 15 are provided with gear teeth on their outer diameter as best depicted in FIG. 7. A pair of threaded worm drives 16, 17 is provided within the housing 1 and each engages with the teeth of one of the geared lock rings 14, 15. One end of each worm drive 16, 17 is rotatably mounted within the housing 1, while the opposite end 18, 19 of the worm drive 16, 17 extends outside the housing 1 such that a user is able to rotate the threaded worm drives 16, 17. Rotation of the threaded worm drives 16, 17 will drive either a clockwise or anticlockwise movement of the geared lock rings 14, 15. The rotation of the geared lock rings 14, 15 is transferred via the threaded engagement to the seat assemblies 12, 13 in order to axially move the seat assemblies 12, 13. This movement is either towards or away from the centre of the housing 1 depending upon the direction of rotation of the threaded worm drives 16, 17.

The assembly of a top entry ball valve 100 according to the present invention will now be described with reference to FIGS. 2, 3 and 4.

Figure 2:
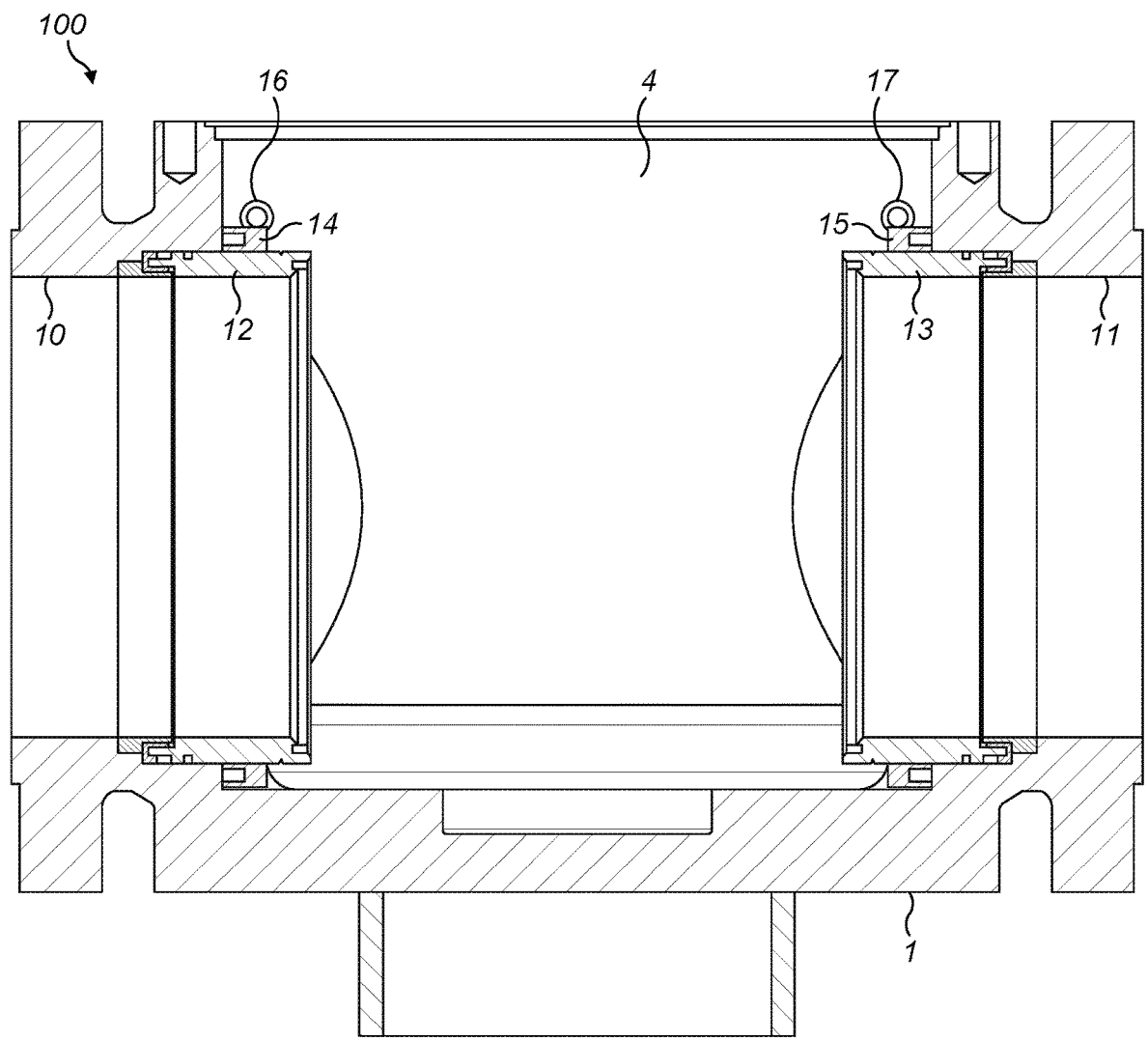
FIG. 2 is a cross-sectional view on the line X-X of FIG. 1, partway through assembly of the top entry ball valve with the valve element yet to be inserted.
Figure 3:
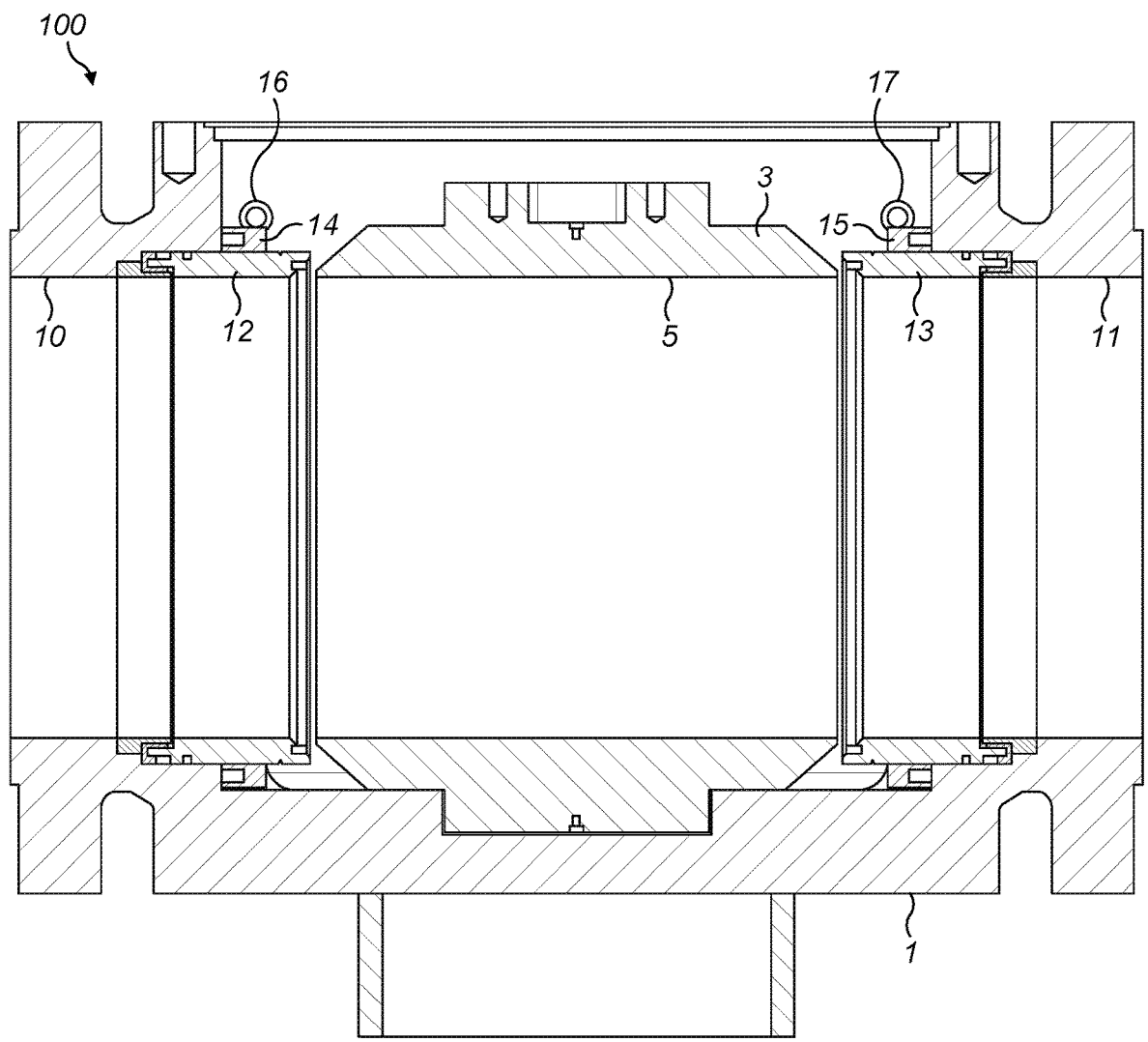
FIG. 3 is a cross-sectional view on the line X-X of FIG. 1, partway through assembly of the top entry ball valve with the valve element inserted.

FIG. 2 depicts a partially assembled top entry ball valve 100. The ball valve element 3 is yet to be inserted into the central cavity 4 of the housing 1. The threaded worm drives 16, 17 have been fully rotated to cause the geared lock rings 14, 15 to move the seat assemblies 12, 13 away from the centre of the housing 1. The ball valve element 3 is then inserted into the central cavity 4 in a direction transverse to the axis of the axially aligned opening bores 10, 11 as shown in FIG. 3. The retraction of the seat assemblies 12, 13 allows the ball valve element 3 to be easily inserted into the central cavity 4.

Figure 4:
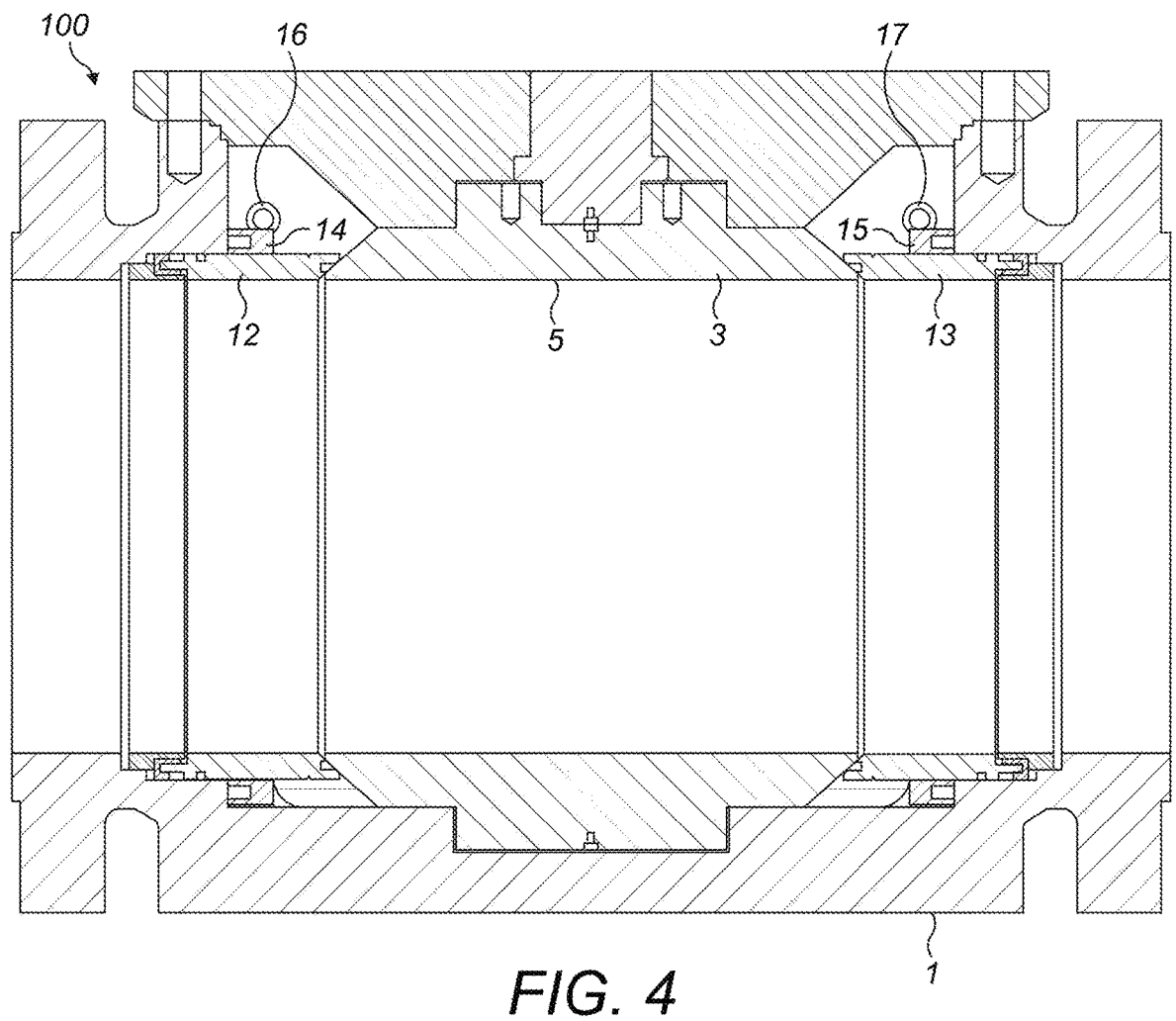
FIG. 4 is a cross-sectional view on the line X-X of FIG. 1 of an assembled top entry ball valve.

Once the ball valve element 3 has been corrected located within the central cavity 4 of the housing 1, the seat assemblies 12, 13 may be moved axially back towards the centre of the housing 1 as shown in FIG. 4. The threaded worm drives 16, 17 are rotated by the user in the opposite direction, causing the geared lock rings 14, 15 to rotate and, via their threaded connection with the seat assemblies 12, 13, causing the seat assemblies 12, 13 to move axially inwards towards the ball valve element 3 until they are in a sealing contact. While in the present embodiment the threaded worm drives 16, 17 are shown without any interconnecting members, embodiments are also envisioned wherein the threaded worm drives 16, 17 are connected to rotate at the same rate. The ball valve lid 2 is then attached to the housing 1 and the top entry ball valve 100 installation is complete.

Figure 5:
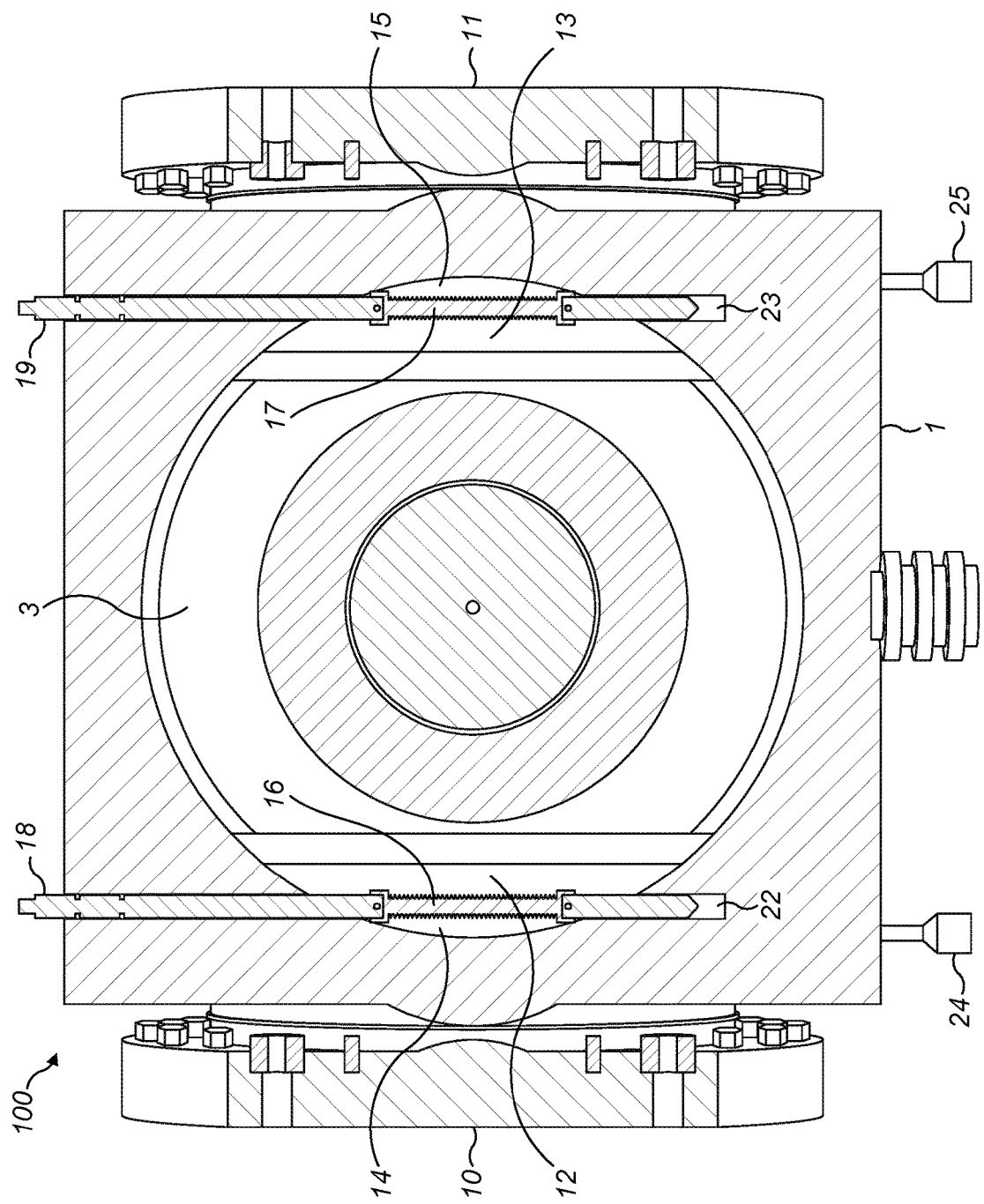
FIG. 5 is a cross-sectional view on the line Y-Y of FIG. 1 of an assembled top entry ball valve.
Figure 6:
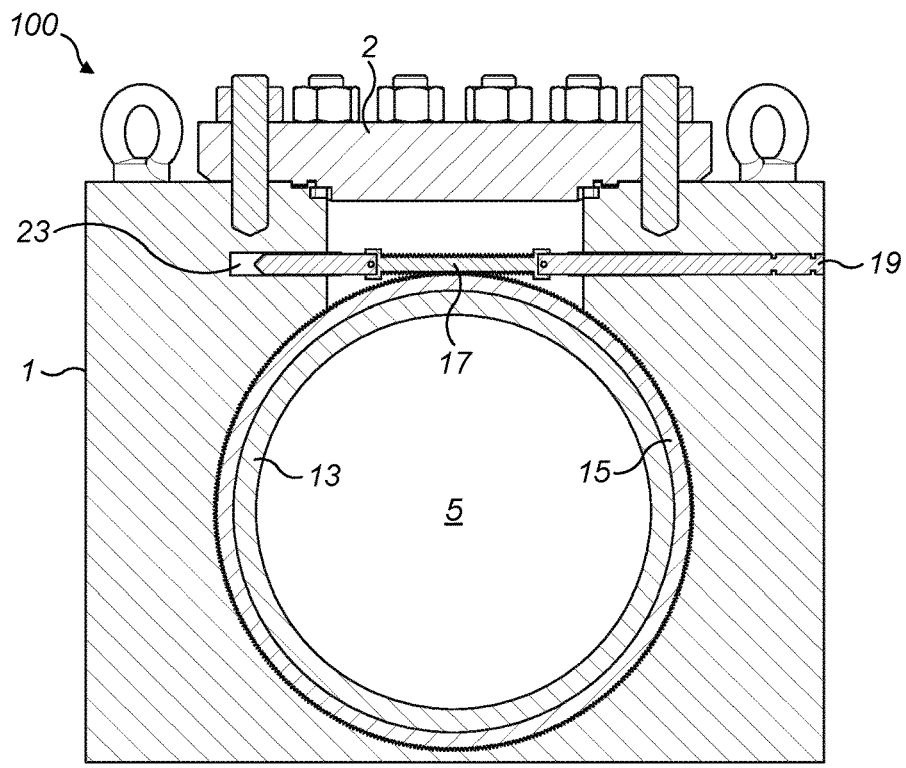
FIG. 6 is a cross-sectional view on the line Z-Z of FIG. 1 of an assembled top entry ball valve.

FIG. 5 depicts a top cutaway view of the top entry ball valve 100 in a fully installed configuration. Bores 22, 23 are provided in the housing 1, in which the threaded worm drives 16, 17 are rotatably mounted. FIGS. 6 and 7 show a side cross sectional view of the top entry ball valve 100.

This top entry ball valve 100 and method of assembly thereof greatly simplifies the valve 100 assembly and disassembly. No special tools are required and as such a single operator may install or uninstall the valve 100 without any additional specialised training, by rotation of the threaded worm drives 16, 17. The simplified assembly also requires fewer access points and as such fewer potential leak paths. Furthermore, if the valve 100 ever becomes jammed the seat assemblies 12, 13 can still be retracted slightly, allowing fluid to flow past the ball valve element 3 in order to flush away any debris which is jamming the top entry ball valve 100. As the seat assemblies 12, 13 become worn through use the threaded worm drives 16, 17 can be further rotated to maintain a fluid seal between the seat assemblies and the ball valve element 3, thereby extending the useful life of the valve 100.

The invention claimed is:

1. A top entry ball valve comprising:
   a housing with a central cavity communicating with two bores which are co-axial along a first axis, the housing including a top opening disposed substantially transverse to the first axis;
   a ball valve element rotatably mounted within the central cavity for rotation about a second axis, the valve element comprising a through bore, the ball valve element being sized to be received into the central cavity through the top opening of the housing;
   first and second seat assemblies, one mounted within each of the co-axial bores;
   a first gear assembly and a second gear assembly engaged with the first and second seat assemblies respectively;
   a first rotatable drive and a second rotatable drive engaged with the first gear assembly and the second gear assembly respectively,
   wherein the first gear assembly and the second gear assembly are configured to move the seat assemblies along the first axis in a first direction away from the valve element when the first rotatable drive and the second rotatable drive are rotated in a first direction, and to move the seat assemblies along the first axis in a second direction, opposite to the first direction, when the first and second drives are rotated in the opposite direction, to bring the seat assemblies into sealing contact with the valve element,
   wherein the first the first gear assembly and the second gear assembly each comprise a ring with gear teeth on an outer surface thereof, wherein each ring is mounted in the housing for rotation about the first axis and is prevented from movement along the first axis.

2. A top entry ball valve according to claim 1, wherein the first rotatable drive and the second rotatable drive each comprise a worm gear engageable with the teeth on the rings.

3. A top entry ball claim according to claim 1, wherein the first and second seat assemblies are prevented from rotation about the first axis.

4. A top entry ball claim according to claim 1, wherein the first and second drives are independently driveable.

5. A top entry ball claim comprising:
- a housing with a central cavity communicating with two bores which are co-axial along a first axis, the housing including a top opening disposed substantially transverse to the first axis;
- a ball valve element rotatably mounted within the central cavity for rotation about a second axis, the valve element comprising a through bore, the ball valve element being sized to be received into the central cavity through the top opening of the housing;
- first and second seat assemblies, one mounted within each of the co-axial bores;
- a first gear assembly and a second gear assembly engaged with the first and second seat assemblies respectively;
- a first rotatable drive and a second rotatable drive engaged with the first gear assembly and the second gear assembly respectively,
- wherein the first gear assembly and the second gear assembly are configured to move the seat assemblies along the first axis in a first direction away from the valve element when the first rotatable drive and the second rotatable drive are rotated in a first direction, and to move the seat assemblies along the first axis in a second direction, opposite to the first direction, when the first and second drives are rotated in the opposite direction, to bring the seat assemblies into sealing contact with the valve element,
- wherein the first gear assembly and the second gear assembly are engaged with the first and second seat assemblies by mating threads.

6. A top entry ball valve comprising:
- a housing with a central cavity communicating with two bores which are co-axial along a first axis, the housing including a top opening disposed substantially transverse to the first axis;
- a ball valve element rotatably mounted within the central cavity for rotation about a second axis, the valve element comprising a through bore, the ball valve element being sized to be received into the central cavity through the top opening of the housing;
- first and second seat assemblies, one mounted within each of the co-axial bores;
- a first gear assembly and a second gear assembly engaged with the first and second seat assemblies respectively;
- a first rotatable drive and a second rotatable drive engaged with the first gear assembly and the second gear assembly respectively,
- wherein the first gear assembly and the second gear assembly are configured to move the seat assemblies along the first axis in a first direction away from the valve element when the first rotatable drive and the second rotatable drive are rotated in a first direction, and to move the seat assemblies along the first axis in a second direction, opposite to the first direction, when the first and second drives are rotated in the opposite direction, to bring the seat assemblies into sealing contact with the valve element,
- wherein the ball valve element is insertable into the central cavity in a direction transverse to the first axis.

\* \* \* \* \*